United States Patent
Yogeeswaran et al.

(10) Patent No.: US 11,750,242 B2
(45) Date of Patent: *Sep. 5, 2023

(54) SURFACE WAVE BASED WIRELESS CONNECTION TO AN ELECTRONIC DEVICE

(71) Applicant: Meta Platforms, Inc., Menlo Park, CA (US)

(72) Inventors: Karthik Yogeeswaran, San Francisco, CA (US); Apoorva Sharma, Sammamish, WA (US)

(73) Assignee: Meta Platforms, Inc., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/750,464

(22) Filed: May 23, 2022

(65) Prior Publication Data
US 2022/0286160 A1 Sep. 8, 2022

Related U.S. Application Data

(63) Continuation of application No. 16/658,038, filed on Oct. 19, 2019, now Pat. No. 11,374,618.

(51) Int. Cl.
*H04B 3/52* (2006.01)
*H04B 5/02* (2006.01)
(Continued)

(52) U.S. Cl.
CPC .......... *H04B 3/52* (2013.01); *H01P 3/10* (2013.01); *H01P 3/16* (2013.01); *H02J 50/20* (2016.02); *H04B 5/02* (2013.01)

(58) Field of Classification Search
CPC .......... H04B 3/52; H04B 3/50; H01P 3/10
(Continued)

(56) References Cited

U.S. PATENT DOCUMENTS 9,337,895 B2 5/2016 Turner et al.
11,374,618 B2 * 6/2022 Yogeeswaran et al. ..................... H02J 50/20

(Continued)

OTHER PUBLICATIONS

Barlow H.M., et al., "Surface Waves," Published in: Proceedings of the IEEE—Part III: Radio and Communication Engineering, Nov. 1953, vol. 100 (68), 13 Pages.

(Continued)

*Primary Examiner* — Benny T Lee
(74) *Attorney, Agent, or Firm* — BakerHostetler

(57) ABSTRACT

Apparatuses, methods, and systems for a surface wave based wireless connection to an electronic device are disclosed. One apparatus includes a surface wave guide that supports propagation of electro-magnetic waves over a two-dimensional conductive surface of the surface waveguide, wherein the two-dimensional conductive surface is treated to increase a surface reactance of the two-dimensional conductive surface over a frequency range of the electro-magnetic waves, while maintaining an insertion loss of the surface waveguide below a threshold. A first mode converter operates to couple electro-magnetic waves of a first mode to the two-dimensional conductive surface having a second mode, wherein the electro-magnetic waves of the second mode propagate across the two-dimensional conductive surface of the surface waveguide. At least a portion of the electromagnetic waves of the two-dimensional conductive surface is coupled to an electronic device through a second mode converter of the electronic device.

20 Claims, 7 Drawing Sheets

(51) Int. Cl.
*H01P 3/16* (2006.01)
*H01P 3/10* (2006.01)
*H02J 50/20* (2016.01)

(58) Field of Classification Search
USPC .......................................................... 333/240
See application file for complete search history.

(56) References Cited

U.S. PATENT DOCUMENTS

2012/0206314 A1   8/2012   Kobayashi
2013/0147573 A1   6/2013   Yamamoto et al.

OTHER PUBLICATIONS

Overfelt P.L., "Review of Electromagnetic Surface Waves: 1960 Through 1987," Naval Weapon Center, Jan. 1988, 38 Pages.
Zucker F.J., "Surface-Wave Antennas," Chapter 10, Rome Laboratory, 2007, 12 Pages.

* cited by examiner

Top View

Coupling, by a first mode converter electro-magnetic waves of a first mode to a two-dimensional conductive surface of a surface waveguide having a second mode, wherein the electro-magnetic waves of the second mode propagate across the two-dimensional conductive surface of the surface waveguide, wherein the surface waveguide supports propagation of electro-magnetic waves over a two-dimensional conductive surface of the surface waveguide, wherein the two- dimensional conductive surface is treated to increase a surface reactance of the two-dimensional conductive surface over a frequency range of the electro-magnetic waves, and to while maintaining an insertion loss of the surface waveguide below a threshold.

710

Coupling, by a second mode converter of the electronic device, at least a portion of the electro-magnetic waves of the two-dimensional conductive surface

SURFACE WAVE BASED WIRELESS CONNECTION TO AN ELECTRONIC DEVICE

RELATED PATENT APPLICATIONS

This patent application is a continuation of U.S. patent application Ser. No. 16/658,038, filed Oct. 19, 2019, issued as U.S. Pat. No. 11,374,618 on Jun. 28, 2022, which is herein incorporated by reference.

FIELD OF THE DESCRIBED EMBODIMENTS

The described embodiments relate generally to energy transfer. More particularly, the described embodiments relate to systems, methods, and apparatuses for a surface wave based wireless connection to an electronic device.

BACKGROUND

The proliferation of modern electronics has led to the need for wireless power transfer either for convenience or for necessity of an application. A common convenience type application is a wireless device charging mat. This is a device which charges any personal electronic devices such as smartphones or headphones placed on it. Such a device could range in size from less than a square foot to an entire tabletop surface. Beyond convenience applications like this there are other applications where it is not possible to connect a power cable to a device which is mobile but traveling within a confined area due to concerns of tangled conductors and size considerations limit the ability to use onboard power storage.

A number of approaches have been taken to achieve wireless power transfer with mixed success. The most common approach is that of inductive coupling. In this method two coils are held parallel to each other transferring energy via magnetic field like two coils of a transformer. This approach is very sensitive to the separation between the coils and their relative alignment. Some products have tried to work around the alignment issues by placing a large number of inductive coils overlapping one another within a charging mat. This method has limited success due to the size of coils needed for good coupling and the impact of overlapping coils on performance. Another more sophisticated approach undertaken involves magnetic resonance coupling. This method works by tuning an LC circuit to improve coupling between coils allowing position flexibility within a limited area proportional to the coil sizes. A third approach is RF energy harvesting potentially using phased array techniques to focus energy to a target device. This approach allows far more mobility of the receive device but provides extremely low amounts of energy and has an extremely low efficiency.

Outside of the wireless power transfer space, there is also the need for wireless communication. While this is most commonly of the form of wide area wireless communication such as cellular or WLAN (wireless local area network), there is also a need for shorter range wireless communication for local device communication or personal area networks. In this application space the requirements differ from that of the prior art. Privacy and security are of greater importance than range. One example of such a device is a wireless keyboard or mouse. In such a device, using conventional wide area wireless technologies such as BLUETOOTH® or WIFI® leave the devices susceptible to snooping by a rogue device with a high gain antenna pointed at the target device as the wireless signals of the target are radiative and by nature travel in all directions from the device. Device antenna gain can be increased to focus the energy in a direction, but this can only diminish the signals going in undesired directions and cannot stop them altogether. Additionally, this comes at the price of the position flexibility of the components. One way to solve this problem involves using extremely low power signals. In normal wireless systems this leaves the device susceptible to dropped connections as the path loss between the devices vary with position, orientation and obstacles placed in proximity so the power level can only be reduced so much before there is a severe performance penalty. To solve this problem, one solution used is what is termed as ultra-wideband signals which use low power spectral density but extremely large bandwidth. The larger bandwidth alleviates some of the challenges of fading. This approach however is limited in throughput because the frequencies used overlap with other spectrum users such as cellular, GPS etc. capping the transmitter power spectral density, limiting performance.

Further, a need exists for short range wireless communication in which the capacity needs of a wireless link is greater than what can be achieved reliably over available wireless spectrum and a wired connection cannot be made between a device and a fixed platform, potentially due to challenges of aligning connector pins or tangled wires.

It is desirable to have methods, apparatuses, and systems for a surface wave based wireless connection to an electronic device.

Brief Summary

An embodiment includes an apparatus. The apparatus includes a surface wave guide, a first mode converter, and a second mode converter. The surface waveguide supports propagation of electro-magnetic waves over a two-dimensional conductive surface of the surface waveguide, wherein the two-dimensional conductive surface is treated to increase a surface reactance (relative to untreated) of the two-dimensional conductive surface over a frequency range of the electro-magnetic waves, while maintaining an insertion loss of the surface waveguide below a threshold. The first mode converter operates to couple electro-magnetic waves of a first mode to the two-dimensional conductive surface having a second mode, wherein the electro-magnetic waves of the second mode propagate across the two-dimensional conductive surface of the surface waveguide. At least a portion of the electro-magnetic waves of the two-dimensional conductive surface is coupled to an electronic device through a second mode converter of the electronic device. The surface reactance of the two-dimensional conductive surface may vary across the two-dimensional surface according to a predetermined pattern.

Another embodiment includes a method. The method includes coupling, by a first mode converter electro-magnetic waves of a first mode to a two-dimensional conductive surface of a surface waveguide having a second mode, wherein the electro-magnetic waves of the second mode propagate across the two-dimensional conductive surface of the surface waveguide, wherein the surface waveguide supports propagation of electro-magnetic waves over a two-dimensional conductive surface of the surface waveguide, wherein the two-dimensional conductive surface is treated to increase a surface reactance (relative to an untreated two-dimensional conductive surface) of the two-dimensional conductive surface over a frequency range of the electro-magnetic waves, while maintaining an insertion loss of the surface waveguide below a threshold, and coupling, by a second mode converter of the electronic device, at least a portion of the electro-magnetic waves of the two-dimensional conductive surface.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 7 shows is a flow chart that includes steps of a method of coupling electro-magnetic energy to an electronic device, according to an embodiment.

DETAILED DESCRIPTION

The embodiments described include methods, apparatuses, and systems for coupling electromagnetic waves from a surface waveguide to an electronic device. The electromagnetic waves may be utilized for energy transfer to the electronic device, and/or for short range electronic communication with the electronic device. For at least some embodiments, the surface waveguide supports propagation of electro-magnetic waves over a two-dimensional conductive surface of the surface waveguide, wherein the two-dimensional conductive surface is treated to increase the surface reactance of the two-dimensional conductive surface over a frequency range of the electro-magnetic waves, while reducing the insertion loss of the two-dimensional surface waveguide. For at least some embodiments, a height of a conductive wall at a periphery of the two-dimensional conductive surface is selected to increase the energy transfer to the electronic device(s), and/or selected to improve the channel characteristics for short range electronic communication with the electronic device.

For at least some embodiments, the surface waveguide is capable of trapping an appropriately coupled electromagnetic mode to the two-dimensional surface without radiating by adjusting a surface reactance of the two-dimensional surface through, for example, some combination of dielectric coatings and surface modulations to vary the wave velocity of the trapped mode versus that of a radiating mode. For at least some embodiments, the selection of dielectric coatings and/or surface modulations is made to maintain an insertion loss below a threshold while maintaining a target velocity factor. The velocity factor represents the varied wave velocity.

Figure 1A:
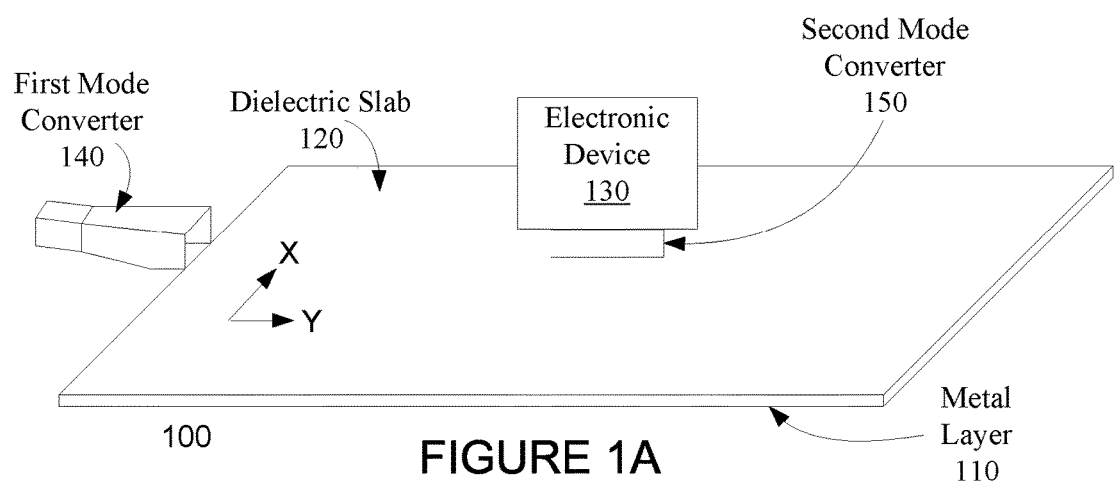
FIGS. 1A, 1B show variations a surface waveguide wherein at least a portion of the electro-magnetic waves of the surface waveguide are coupled to an electronic device, according to an embodiment.
Figure 1B:
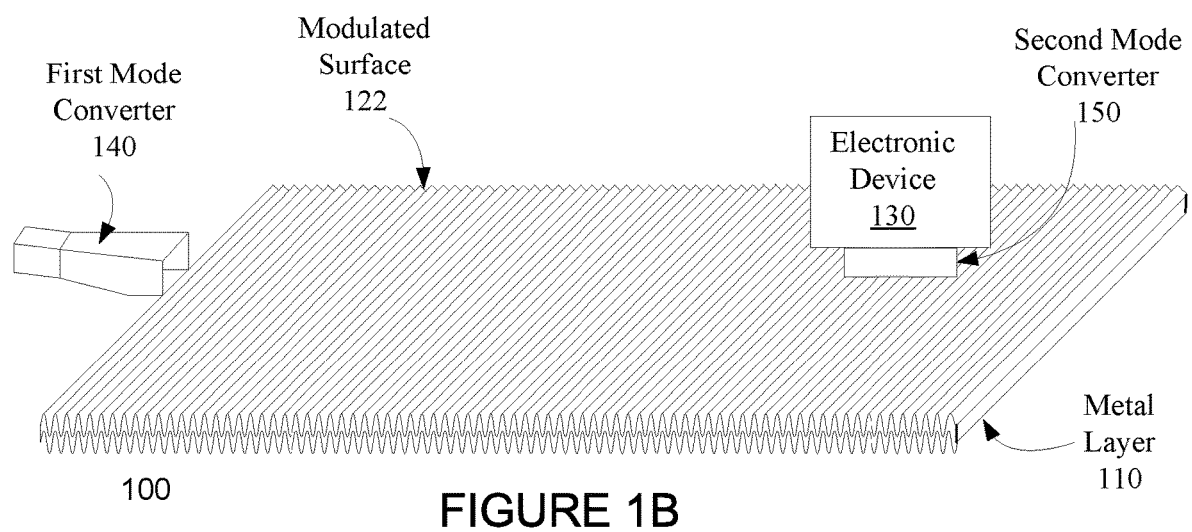

FIGS. 1A, 1B show variations a surface waveguide 100 wherein at least a portion of the electro-magnetic waves of the surface waveguide 100 are coupled to an electronic device 130, according to an embodiment. As shown, the surface waveguide 100 includes a two-dimensional conductive (metal) surface (layer) 110. For at least some embodiments, the surface waveguide 100 supports propagation of electro-magnetic waves over a two-dimensional conductive surface (shown as dimensions X and Y) of the surface waveguide 100.

For at least some embodiments, a first mode converter 140 is operative to couple electro-magnetic waves of a first mode to the two-dimensional conductive surface 110 having a second mode, wherein the electro-magnetic waves of the second mode propagate across the two-dimensional conductive surface 110.

For at least some embodiments, at least a portion of the electro-magnetic waves of the two-dimensional conductive surface are coupled to the electronic device 130 through a second mode converter 150 of the electronic device 130. For an embodiment, the coupled at least the portion of the electro-magnetic waves of the two-dimensional conductive surface provide electro-magnetic energy for charging the electronic device. For an embodiment, the coupled at least the portion of the electro-magnetic waves of the two-dimensional conductive surface facilitates communication between the apparatus and the electronic device. For an embodiment, the coupled at least the portion of the electro-magnetic waves of the two-dimensional conductive surface provide electro-magnetic energy for charging the electronic device, and facilitates communication between the apparatus and the electronic device.

As previously stated, for at least some embodiments, the surface waveguide supports propagation of electro-magnetic waves over a two-dimensional conductive surface of the surface waveguide, wherein the two-dimensional conductive surface is treated to increase the surface reactance of the two-dimensional conductive surface over a frequency range of electromagnetic waves while reducing the insertion loss of the two dimensional surface waveguide. FIG. 1A shows an embodiment wherein treating the two-dimensional conductive surface (metal layer) 100 includes affixing a dielectric layer (slab) 120 adjacent to the two-dimensional conductive metal surface layer 110. In embodiments such as FIG. 1A reducing the insertion loss includes selecting a dielectric material with a low loss tangent (loss tangent below a threshold) at the frequency of operation. FIG. 1B shows an embodiment of a surface waveguide 100 in which treating the two-dimensional conductive surface includes modulating the two-dimensional conductive surface (metal layer) 100. As shown in FIG. 1B, the two-dimensional conductive surface (metal layer) 100 is modulated by deforming the two-dimensional conductive surface (metal layer) 100 to include a corrugated surface 122. As previously described, for at least some embodiments, a first mode converter 140 is operative to couple electro-magnetic waves of a first mode to the two-dimensional conductive surface (metal layer) 110 having a second mode, wherein the electro-magnetic waves of the second mode propagate across the two-dimensional conductive surface (metal layer) 110. For at least some embodiments, at least a portion of the electro-magnetic waves of the two-dimensional conductive surface are coupled to the electronic device 130 through a second mode converter 150 of the electronic device 130.

As described, the embodiments involve creating a two-dimensional surface waveguide. At least some embodiments of the two-dimensional surface waveguide are flat, but at least some embodiments can be made of a flexible material by carefully selecting the flexibility such that the bend radius of the surface is within the radius under which the field stays trapped to the surface waveguide. For an embodiment, the surface waveguide includes a metal sheet with a dielectric coating and in other embodiments the surface waveguide may be a corrugated (or otherwise modulated) metal surface with or without a dielectric coating. Different surface modes may be created for example by only using a dielectric slab without a metal surface or by using a pair of materials with dissimilar permeability or permittivity. The described embodiments focus on one type of surface mode described in detail. However, one may extend the described embodiments to use one of the other types of surface wave modes and waveguide media.

In one example of a dielectric coated surface waveguide includes a copper, aluminum or silver foil coated with a dielectric. The foil is selected for low resistance to minimize loss. The dielectric is selected primarily based on the loss tangent of the material at the frequency of operation and the dielectric constant. The thickness of the dielectric and dielectric constant control the wave velocity, cutoff frequency, and proportion of the wave trapped in the dielectric versus trapped in the air above the dielectric. The more energy trapped in the dielectric the more loss will be induced due to the dielectric loss of the material while at the same time the less the field extends beyond the surface of the dielectric. A specific embodiment includes a silver foil layer and a ceramic SiO2 dielectric with high Q factor which has a dielectric constant of 3.7 and a loss tangent of $2.5*10^{-4}$ at 30 GHz. The ceramic dielectric layer is 1.3 mm thick. This yields a loss of approximately 1.1 dB per meter with approximately 50% of the energy traveling within the dielectric. The velocity factor is approximately 0.8 which yields a field extension from the foil of approximately 1.2 mm for 50% of the energy, 90% of the energy within 3 mm and 99.7% of the energy within 1 cm of the foil. The cutoff frequency for this surface waveguide is over 50 GHz. A wave launched onto this surface waveguide appropriately travels along it without radiating until encountering the edge of the surface waveguide where some fraction will be reflected with the remainder being radiated away.

FIGS. 2A, 2B, 2C, 2D, 2E show portions of several different implementations of a treated two-dimensional conductive surface of a surface waveguide, according to embodiments. As previously described, for at least some embodiments, the surface waveguide is capable of trapping an appropriately coupled electromagnetic mode to the two-dimensional surface without radiating by adjusting a surface reactance of the two-dimensional surface through, for example, some combination of dielectric coatings and surface modulations to vary the wave velocity of the trapped mode versus that of a radiating mode. FIGS. 2A, 2B, 2C, 2D, 2E, show examples of combinations of dielectric coatings and surface modulations. For at least some embodiments, the selection of dielectric coatings and/or surface modulations is made to maintain an insertion loss below a threshold while maintaining a target velocity factor. The velocity factor represents the varied wave velocity.

Figure 2A:
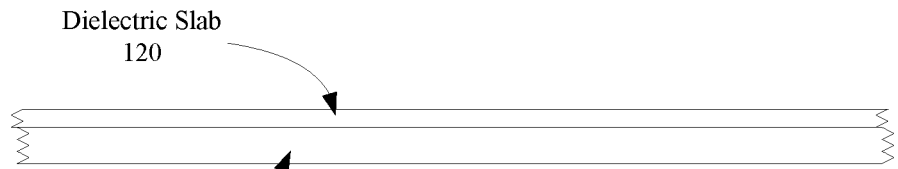
FIGS. 2A, 2B, 2C, 2D, 2E show portions of several different implementations of a treated two-dimensional conductive surface of a surface waveguide, according to embodiments.
Figure 2B:
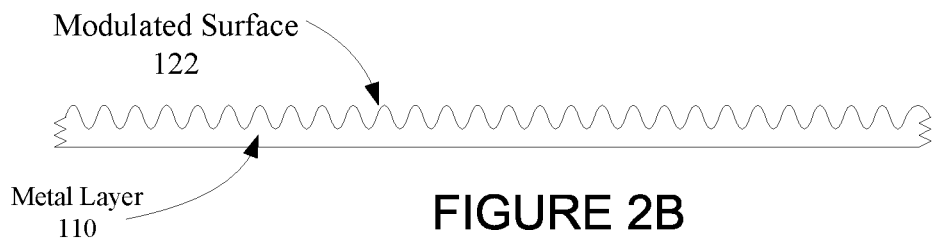
Figure 2C:
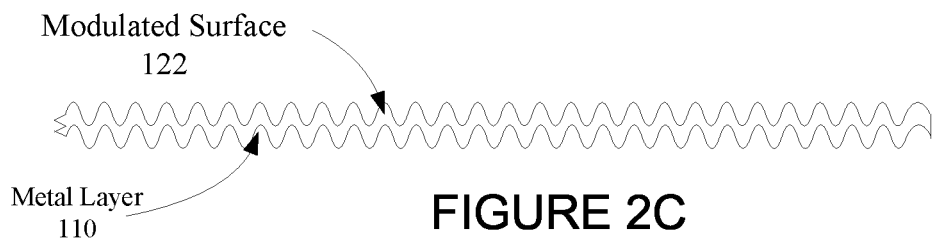
Figure 2D:
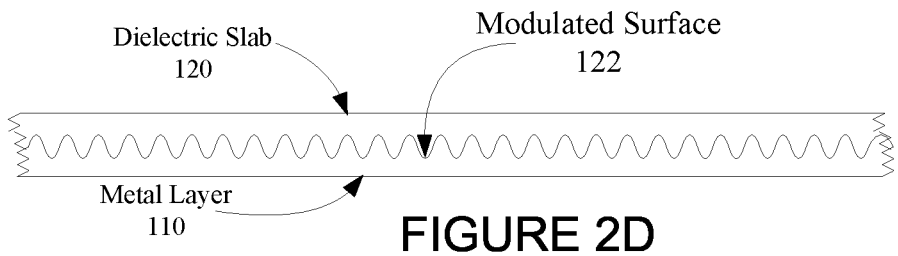
Figure 2E:
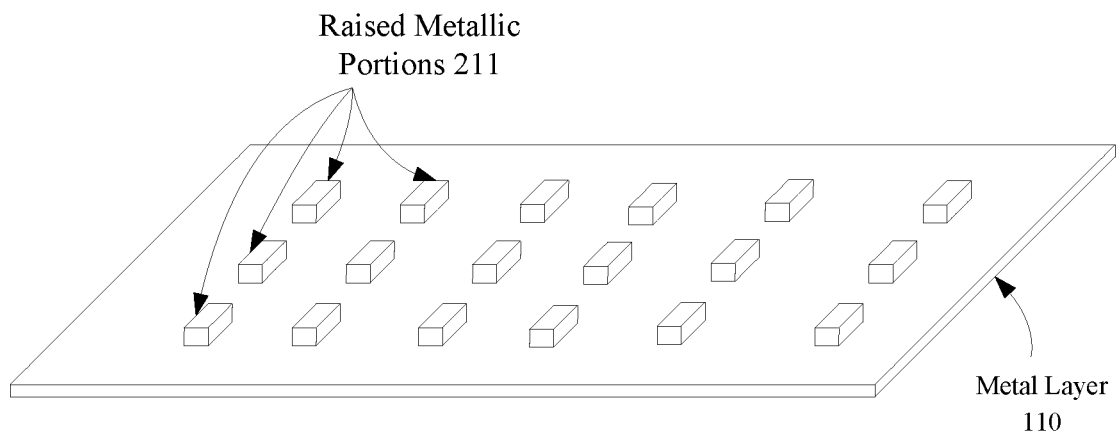

FIG. 2B shows a two-dimensional surface that includes a modulated surface 122 of the metal layer 110. FIG. 2C also shows a two-dimensional surface that includes the modulated surface 122 of the metal layer 110. FIG. 2D shows a two-dimensional surface that includes both the modulated surface 122 of the metal layer 110, and a dielectric slab 120 adjacent to the metal layer 110. FIG. 2E shows another example of surface modulation of the metal layer 110 that includes raised metallic portions 211 over the metal layer 110. Note that FIG. 2E only shows a portion of the two-dimensional surface which is not drawn to scale. Regarding the surface modulation, for an embodiment, the modulated surface 122 includes surface irregularities that include, for example, a repetitive structure with a repetitive structure with a tighter physical pitch (between the repeating structures) than the wavelength of the electromagnetic waves that propagate across the surface.

Figure 3:
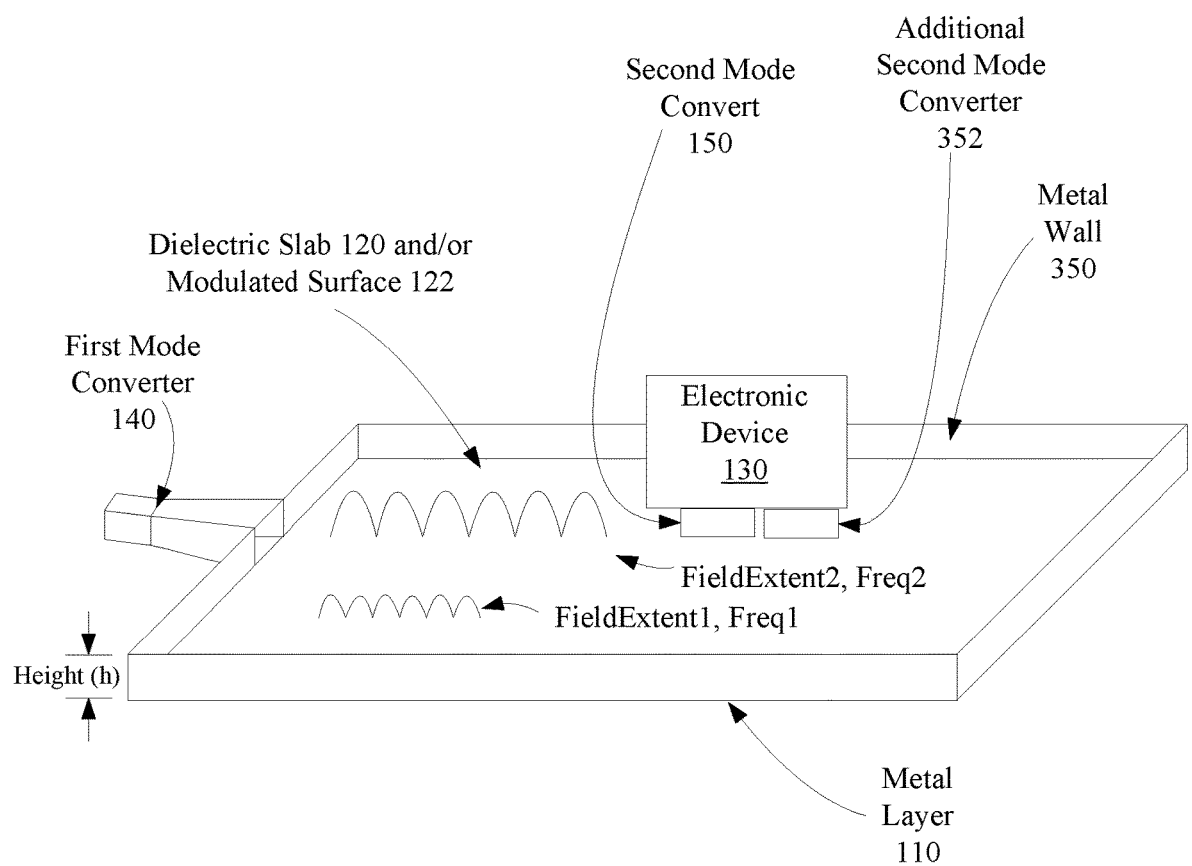
FIG. 3 shows a surface waveguide that includes a conductive metal wall at a periphery of a two-dimensional conductive surface of the waveguide, according to an embodiment.

FIG. 3 shows a surface waveguide that includes a conductive metal wall 350 at a periphery of a two-dimensional conductive surface of the waveguide having a dielectric slab 120 and/or a modulated surface 122, according to an embodiment. For at least some embodiments, the conductive metal wall 350 serves the purpose of reflecting at least a portion of the electro-magnetic waves propagating across the two-dimensional conductive surface (metal layer) 110. For an embodiment, the height (h) of the conductive metal wall 350 is selected to be higher than a height of a field extent of electromagnetic waves travelling along the surface of the surface waveguide immediately adjacent to the conductive metal wall 350. A surface electromagnetic wave travelling on the surface of the surface waveguide will extend into free space above the surface waveguide without radiating. The amount of energy at a given distance (or height) from the surface waveguide will depend on the wave velocity at a given frequency which is dependent on the surface reactance. For an embodiment, the height (or distance above the surface) of the field extent of the electromagnetic waves is the height below which a specific predetermined fraction of the total energy of the electromagnetic waves is contained (for example, 99.7% of the energy). As described, for at least some embodiments, at least one of a frequency of the electro-magnetic waves propagating over the two-dimensional conductive surface of the surface waveguide, a thickness of a dielectric layer of the surface waveguide, or a dielectric constant of the dielectric layer, is selected to maintain a height of a field extent of the electromagnetic waves below a threshold, wherein the height of the field extent of the electromagnetic waves is a height at which at least a certain amount of energy is below the height above the conductor of the surface waveguide. As previously described, for at least some embodiments, a first mode converter 140 is operative to couple electro-magnetic waves of a first mode to the two-dimensional conductive surface (metal layer) 110 having a second mode, wherein the electro-magnetic waves of the second mode propagate across the two-dimensional conductive surface (metal layer) 110. For at least some embodiments, at least a portion of the electro-magnetic waves of the two-dimensional conductive surface are coupled to the electronic device 130 through a second mode converter 150 of the electronic device 130.

As described, for an embodiment, the conductive wall 350 is included as a boundary along the periphery of the surface waveguide. An embodiment includes selecting the height of the conductive wall 350 based on at least one of a frequency of the electro-magnetic waves, a dielectric constant of the dielectric layer, or a thickness of the dielectric layer. An electro-magnetic wave launched (coupled through the first mode converter 140) onto the surface waveguide appropriately will travel along it without radiating until encountering the edge of the surface waveguide where some fraction will be reflected with the remainder being radiated away. For an embodiment, the conductive wall 350 is added along the periphery of the surface waveguide to reduce the radiation. For an embodiment, this includes adding a metallic wall around the edge of the surface waveguide that is sufficiently tall proportional to the field extension. In the previous example a 1 cm tall wall would reflect 99.7% of the energy at 25 GHz at the boundary back onto the surface waveguide.

For at least some embodiments, a coupled at least a first portion of the electro-magnetic waves of the two-dimensional conductive surface having at least a first frequency provide electro-magnetic energy for charging the electronic device, and wherein a coupled at least a second portion of the electro-magnetic waves of the two-dimensional conductive surface having at least a second frequency facilitates communication between the apparatus and the electronic device. As shown in FIG. 3, the electro-magnetic waves coupled to the surface of the surface waveguide can include multiple frequencies, such as, Freq1, Freq2. Further, as shown in FIG. 3, the electro-magnetic waves coupled to the surface of the surface waveguide can include multiple field extensions (FieldExtent1 and FieldExtent2).

For an embodiment, the first frequency (Freq1) is greater than the second frequency (Freq2), and a height (h) of the conductive wall 350 is selected based on the first frequency and the second frequency. That is, as the frequency of the electro-magnetic waves coupled to the surface of the surface waveguide increases, the field extension of the electro-magnetic waves at that frequency will naturally decrease. For an embodiment, at least predetermined amount of energy of the electromagnetic waves at the first frequency is reflected by the conductive wall, and at least a predetermined amount of energy of the electromagnetic waves at the second frequency is not reflected by the conductive wall. That is, the height of the wall reflects the electro-magnetic waves based on the height of the conductive wall 350 relative to the field extension of the electro-magnetic waves at each frequency. Accordingly, a conductive wall 350 height (h) can be selected to reflect the almost all higher frequency (Freq1) electro-magnetic waves but not reflect much of the lower frequency (Freq2) wave energy because the higher frequency electro-magnetic waves will have a smaller field extension than the lower frequency electro-magnetic waves.

At least some embodiments include additional mode converters (such as, an additional second mode converter 352. While the surface wave guide may be able to support a large bandwidth of frequencies of the electromagnetic waves propagating across the two-dimensional conductive surface 110, the first and second mode converters 140, 150 may not be able to support the same large bandwidth. Accordingly, at least some embodiments include a plurality of first mode converters (such as, the first mode converter 140 and other possible first mode converters not shown in FIG. 3) for coupling (launching) different frequencies of electromagnetic waves onto the two-dimensional conductive surface 110 of the surface waveguide. Further, at least some embodiments include a plurality of second mode converters (such as, second mode converters 150, 352) for coupling different frequencies of electromagnetic waves from the two-dimensional conductive surface 110 of the surface waveguide to the electronic device 130.

For example, the first mode converter 140 may launch electromagnetic energy to the surface waveguide at the frequency Freq1 and an additional first converter (not shown in FIG. 3) may launch electromagnetic energy to the surface waveguide at the frequency Freq2. Further, the second mode converter 150 may couple charging electromagnetic energy to the electronic device 130 at the frequency Freq1 and the additional second mode converter 352 may couple communication signals to the electronic device 130 at the frequency Freq2. For an embodiment, the charging electromagnetic energy at the frequency Freq1 goes to a rectifier of the electronic device 130, and the communication signals at the frequency Freq2 go to a modem integrated circuit of the electronic device 130. For example, data may be passed to the electronic device 130 at, for example, 5.8 GHz, and energy may be passed to the electronic device 130 at, for example, 24 GHz. An embodiment of an exemplary WR42 input waveguide feeding the horn mode converter (first mode converter) only goes as low at 17 GHz and cannot carry 5.8 GHz signal. Further, an exemplary monopole (second mode converter) also will not work too well at 5.8 GHz. Therefore, an additional first mode converter and an additional second mode converter can be includes to extend the useable frequency range.

Figure 4A:
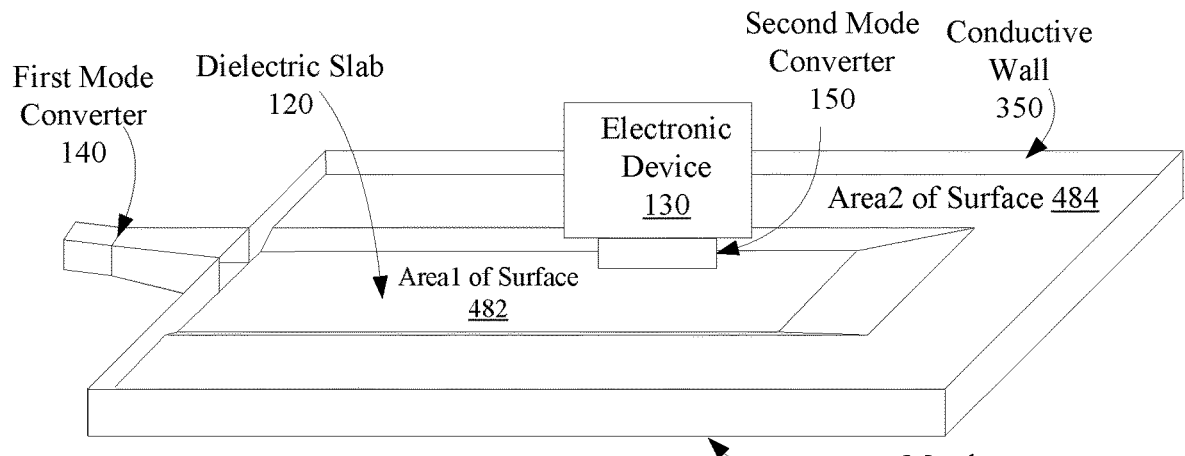
FIGS. 4A, 4B, 4C shows a surface waveguide, wherein a two-dimensional conductive surface of the waveguide includes a selectively varied surface reactance, according to an embodiment.
Figure 4B:
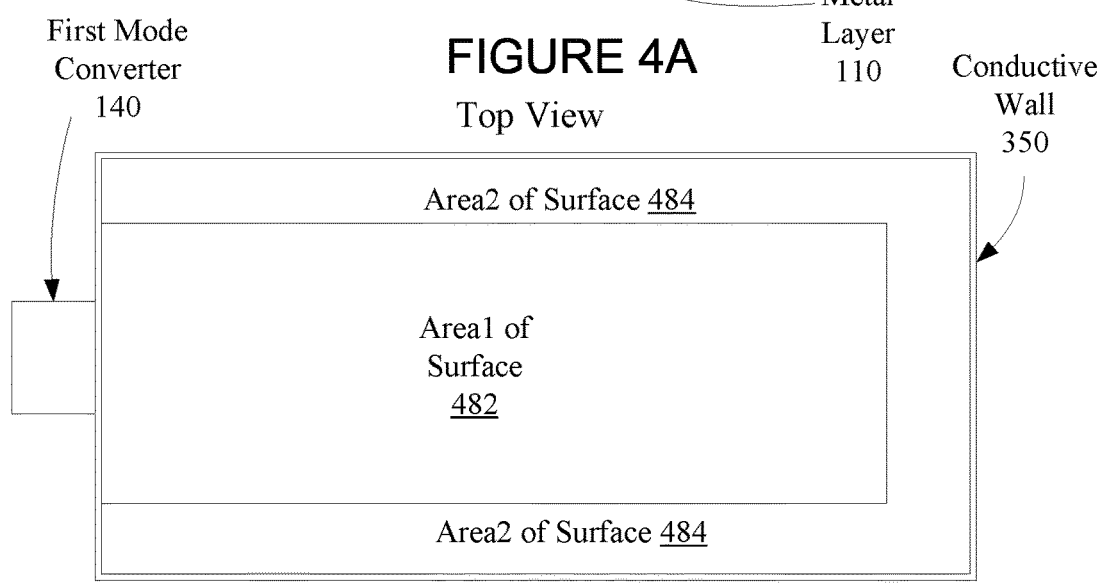

FIG. 4A, 4B shows a surface waveguide, wherein a two-dimensional conductive surface of the waveguide includes a selectively varied surface reactance, according to an embodiment. For at least some embodiments, adding a tall wall around the periphery of the surface waveguide is not ideal from a usability standpoint. An embodiment includes reducing the field extension of the electromagnetic waves in the region immediately adjacent to the conductive wall 350 such that a shorter wall is able to reflect almost all of the energy at a given frequency. For an embodiment, the field extension is reduced by increasing the thickness of the dielectric or by increasing the dielectric constant. Increasing the thickness of the dielectric can be done by ramping (increasing) the thickness of the dielectric gradually to avoid introducing a discontinuity which causes radiation as shown in FIG. 4A. Increasing the dielectric constant can be done be introducing a wedge of a higher dielectric material by the conductive wall and tapering the dielectric thickness so that the combined thickness is constant and the averaged dielectric gradually increases closer to the conductive wall. One embodiment of increasing the thickness of the dielectric includes the dielectric thickness tapered from 1.3 mm to 2.9 mm as the surface waveguide approached the conductive wall. At this thickness of 2.9 mm the loss per meter due to the loss tangent of the dielectric almost doubles but due to the short path length at this thickness there isn't a significant penalty to the system performance. This thickness yields a velocity factor of 0.6 and a 99.7% field extension of 4.4 mm which allows a much shorter conductive wall height. Any gap between the top of the dielectric and the wall edge can be filled with low loss foam with air like dielectric properties.

As shown in FIG. 4A, the thickness of the dielectric slab 120 increases in proximity with the conductive wall 350. That is, the dielectric slab 120 has a first thickness at an Area1 482 of the surface, and a second (greater) thickness at an Area2 484 of the surface. As previously stated, the dielectric thickness can be used to control the surface reactance, and accordingly, control the height of the field extension of the electromagnetic waves propagating across the surface. Accordingly, the thicker dielectric located proximate to the conductive wall 350 allows for a reduction in the height of the conductive wall 350 to a more suitable height.

FIG. 4B shows a top-view of the surface waveguide, and shows areas (Area1 482, Area2 484) of the surface, wherein the area Area2 484 is proximate to the conductive wall 350. For at least some embodiments, the surface reactance proximate to the conductive wall 350 is controlled or selected to allow for a desired wall height. For an embodiment, this includes varying the surface reactance across the surface. As previously described, the surface reactance can be controlled by selection of the dielectric thickness, the dielectric constant of the dielectric, or by modulating the surface of the metal layer 110 (FIG. 4A). Accordingly, at least some embodiments include varying one or more of the dielectric thickness, the dielectric constant of the dielectric, or the modulated the surface of the metal layer 110 to allow for selection of a desired height of the conductive wall 350. Further, as previously described, the height of the conductive wall is dependent on the frequency of the electromagnetic waves propagating across the surface. As previously described, for at least some embodiments, a first mode converter 140 is operative to couple electro-magnetic waves of a first mode to the metal layer 110 having a second mode, wherein the electro-magnetic waves of the second mode propagate across the metal layer 110 (FIG. 4A) and coupled to the electronic device 130 through the second mode converter 150 as shown in FIG. 4A.

Figure 4C:
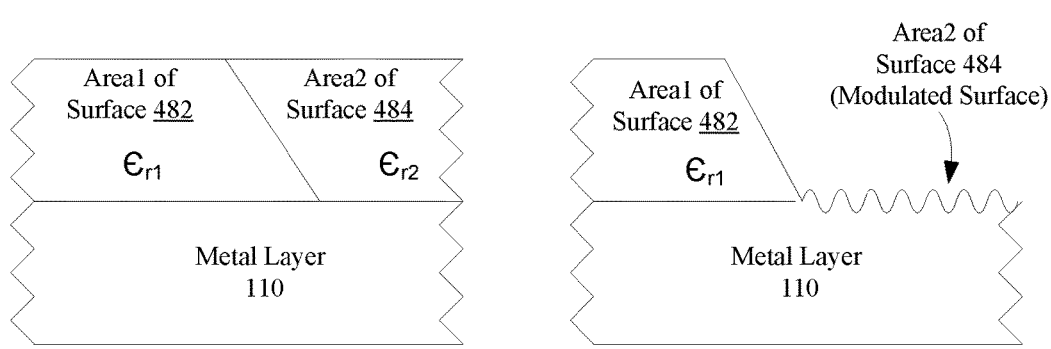

FIG. 4C show a couple of possible transitions of the surface reactance of the conductive surface of the surface waveguide. Additionally or alternatively to changing the thickness of the dielectric, the dielectric constant may change from a first value ($\epsilon_{r1}$) to a second value ($\epsilon_{r2}$) when transitioning from the Area1 482 of the surface to the Area2 484 of the surface. Further, the modulating of the conductive surface of the metal layer 110 may transition or change when transitioning from the Area1 482 of the surface to the Area2 484 of the surface. For example, as shown, the surface of the metal layer 110 may have a dielectric over the Area2 484 of the surface, and the surface of the metal layer 110 may over the Area2 484 of the surface.

For at least some embodiments, the surface reactance of the two-dimensional conductive surface varies across the two-dimensional conductive surface according to a predetermined pattern. For an embodiment, as described, the predetermined pattern includes the surface reactance increasing at the edges of the periphery of the two-dimensional conductive surface to allow for a decrease in the height of the conductive wall. However, other predetermined patterns are possible. For example, for an embodiment, the surface reactance is varied to inhibit or diminish energy transfer based on use patterns to for example provide no energy transfer at some locations. The predetermined patterns of the surface reactance can be used to provide locations over the surface for enhanced energy transfer or for reduced energy transfer.

For simplicity, the cavity (surface waveguide) described above with a lossless dielectric material can be examined. There will be nulls and maxima of the coupling between any two points on the surface waveguide due to the reflections within the surface. At any given pair of points there will be a frequency which is at a maxima and others which will be a null. In the no dielectric loss scenario this maxima is lossless. As the surface waveguide is designed to be broadband, a lossless frequency can be selected for energy transfer as long as the converters for either end are sufficiently broadband to encompass one of the many lossless wavelengths. In reality there is loss in the dielectric and in the foil and this will lead to a non-zero loss, however by designing the converters carefully, placing the energy and data source in an appropriate position and setting the shape of the surface waveguide appropriately, it can be ensured that the maximum pathlength travelled on the surface waveguide is minimized ensuring the lowest loss. Another approach which can be used instead of varying frequency to move the location of nulls and maxima, would be to utilize diversity converters (more than one fixed converter location separate from each other such that for a given frequency there is always a maxima) or to harness phased array techniques with more than one fixed converter to intentionally place a maxima or a null. An embodiment includes null stirring (a method of moving a wave reflector) on the surface of the surface waveguide. Other embodiments can include phased array techniques, such as, diversity antennas.

Figure 5A:
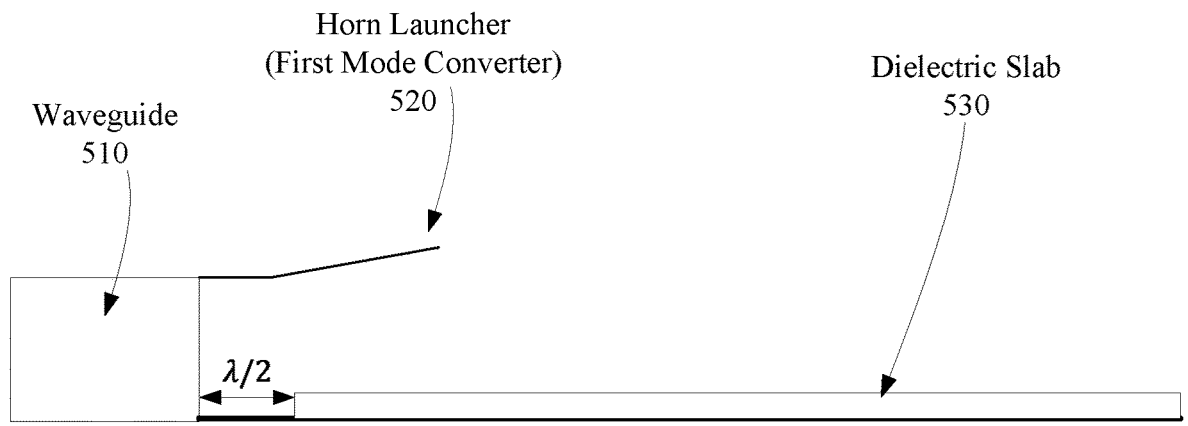
FIGS. 5A, 5B show a first mode converter, and a second mode converter of an electronic device, according to an embodiment.
Figure 5B:
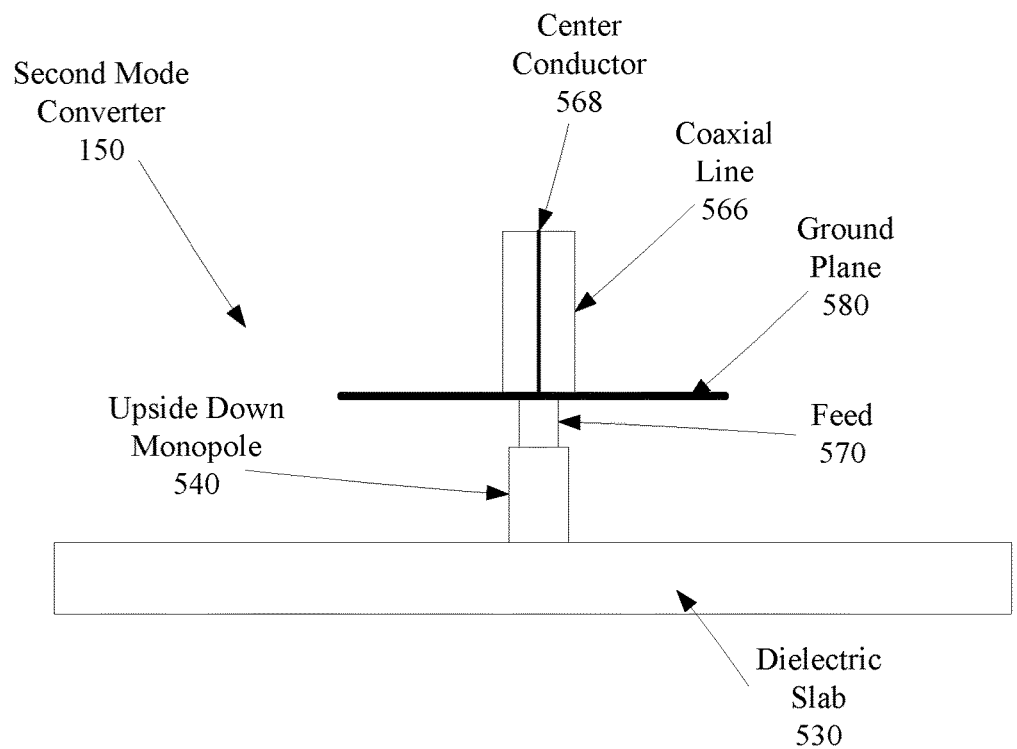

FIGS. 5A, 5B show a first mode converter (i.e., horn launcher) 520, and a second mode converter 150 (FIG. 5B) of an electronic device, according to an embodiment. A number of different surface waveguide converter mechanisms can be used. The described embodiments include transferring energy and information from a static feed to an electronic device placed anywhere on the surface. The system can be optimized by using a larger and more efficient and broadband converter in a fixed optimal location.

For at least some embodiments, the first mode converter 520 operates to convert contained electromagnetic waves (contained by enclosed structures such as rectangular or circular waveguides or confined between parallel conductors such as coaxial cable, coplanar waveguide, etc.) to a second mode specifically chosen allow the electromagnetic waves to propagate on an unenclosed surface waveguide without radiating.

For an embodiment of the previously described waveguide the stationary source converter could be of the form of a horn shaped launcher 520 which converts a TE mode from a WR42 waveguide 510 to a hybrid mode on the surface waveguide. For an embodiment, the converter is placed off of the surface waveguide with the horn aperture of the horn shaped launcher 520 abutting the edge of the cavity with the cavity opened at the aperture and a dielectric slab 530 in the horn such that the proper mode is excited on the surface waveguide. The corners of the cavity and a junction between the horn aperture and the surface waveguide may be curved or comprise a number of smaller angles so as to minimize the leakage of energy at the corners of the waveguide and to minimize back reflection into the horn 520. In some cases, the cavity wall opposite to the horn 520 can be angled to minimize the direct reflection of energy from the horn 520 back into it. For an embodiment, a distance between the waveguide 510 and the dielectric slab 530 is selected to be $\lambda/2$ (FIG. 5A), wherein $\lambda$ is the wavelength of the electromagnetic waves.

For the second converter 150 of the electronic device, a number of different structures can be used depending on the size and constraints of the electronic device. As the electronic device may be placed anywhere on the surface the field pattern of the second converter 150 may be optimally omnidirectional instead of directional as in the case of a horn. This is because the electronic device and therefore its converter could be rotated in any direction and may be placed abutting the edge of the cavity etc. In some applications, the size and weight of the converter 150 must be constrained. One method to achieve this is to utilize a monopole type structure (such as the upside-down monopole 540 as shown in FIG. 5B) adapted to couple the hybrid mode from the surface waveguide into the electronic device. The monopole is inherently a more narrow-band than the horn type structure but the bandwidth is more than adequate to ensure the presence of near lossless wavelengths for coupling between the converters. For an embodiment as shown in FIG. 5B, the second mode converter 150 is interfaced with, for example, a coaxial line 566 that includes a center conductor 568. An outer conductor of the coaxial line 566 is connected to a ground plane 580 of the second converter 150. The center conductor 568 is interfaced with a feed 570 of the second mode converter 150.

It is to be understood that the monopole type structure (such as the upside-down monopole 540) shown in FIG. 5B is one example of a possible second mode converter. Other types of second mode converters may be additionally or alternatively utilized. As previously described, multiple second mode converters can be used to increase the useable frequency range. Other mode converters may include one or more of circular or square shaped patch antennas, slotted antennas, printed monopole antennas, and/or PCB (printed circuit board)/planar antennas. It is to be understood that this is not a complete list of possible mode converters.

As previously stated, for an embodiment, the first mode couple is directional. Further, as previously stated, for an embodiment, the second mode converter is omnidirectional.

Figure 6:
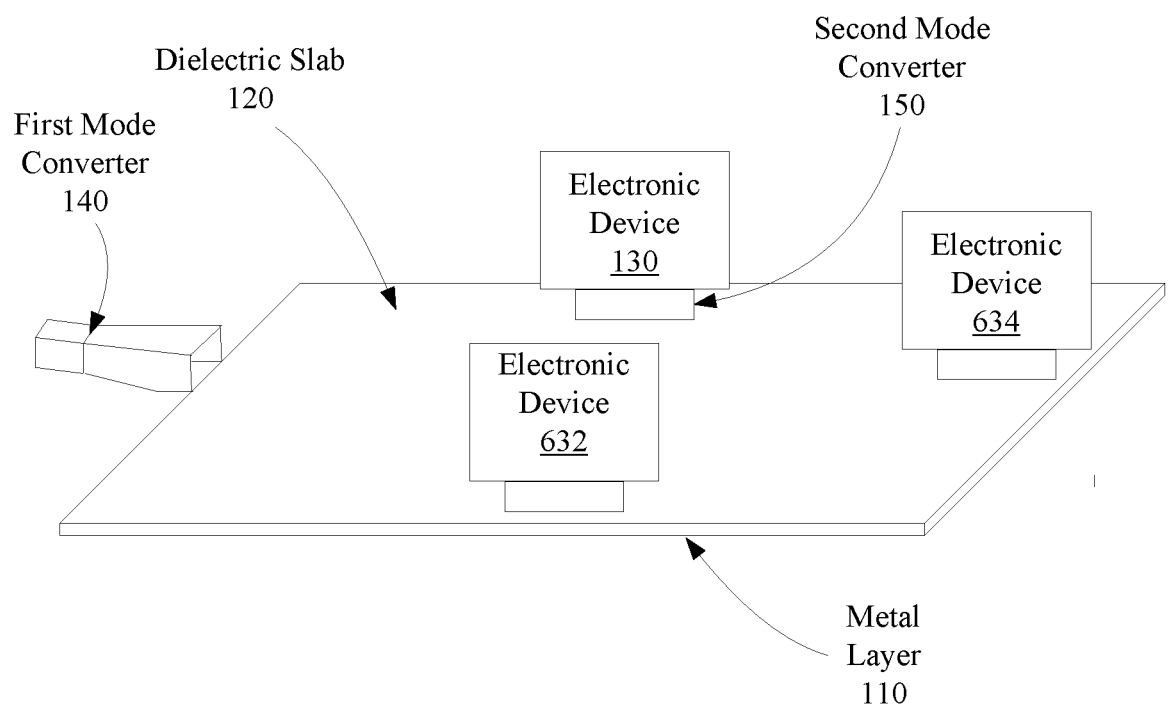
FIG. 6 shows another surface waveguide, wherein at least a portion of electro-magnetic waves of the surface waveguide are coupled to a plurality of electronic devices, according to an embodiment.

FIG. 6 shows another surface waveguide, wherein at least a portion of electro-magnetic waves of the surface waveguide are coupled to a plurality of electronic devices, according to an embodiment.

That is, a single surface wave guide can be used to couple electromagnetic energy to a plurality of electronic devices 130, 632, 634 through a two-dimensional surface that includes a metal layer 110 with a dielectric slab 120. Each of the electronic devices 130, 632, 634 may include a second mode converter (such as, mode converter 150) that couples electromagnetic surface waves of the surface waveguide. FIG. 6 illustrates that multiple electronic devices 130, 632, 634 can simultaneously couple energy from the surface waveguide. As previously described, for at least some embodiments, a first mode converter 140 is operative to couple electro-magnetic waves of a first mode to the metal layer 110 having a second mode, wherein the electromagnetic waves of the second mode propagate across the metal layer 110.

Beyond the applications requiring a static converter to mobile converter, the same surface waveguide could be used to couple data signals or power between one or more electronic devices placed on the surface waveguide. For an embodiment, the surface waveguide acts as a secure, low loss channel for data and energy transfer between any devices placed on it.

For the wireless energy transfer use case, the electromagnetic energy source can be a cavity magnetron. This would yield an efficiency of 60% to 70% in DC to RF (or mm wave) energy conversion at the source. Other RF (or mm wave) sources may also be used. If a multiple source scenario is to be used, having a number of lower power sources which can be tuned in frequency and phase to steer energy within the cavity may be optimal.

For the scenario with only a single first mode converter, as the low loss wavelength will vary as the relative position of the converters changes, it is critical that a source can be swept over a predetermined range of wavelengths based on the expected range of wavelengths required to ensure the presence of a near lossless coupling wavelength.

For the communication use case and additionally for the benefit of finding the near lossless wavelengths over which to transmit power, a swept RF (or mm wave) source may be used which interrogates at the electronic device at each frequency. If no electronic device is present on the surface waveguide or if the specific frequency of transmission is a null for the electronic device, there will be no response by an electronic device and the interrogator will move to the next frequency. If an electronic device is present and can receive the interrogator signal, the electronic device can respond to the interrogator with the identification signal thereof, the type of connection to be provided and the particulars of this (desired power level etc.) and the receive signal strength. The interrogator will continue to hop through the remaining frequencies in this fashion. The interrogator will at the end of the sweep select the lowest loss wavelength and transmit the required information or energy to the device. In the case of more than one electronic device on the platform, the interrogator will collect the lowest loss wavelengths from each device on the platform. Well known methods of collision avoidance from the wireless industry can be used to successfully collect information from more than one device at a given frequency. For an embodiment, a determination of the best (or better than a threshold) frequency of energy transfer to one or more electronic devices can be determined through a swept S11 (input reflection coefficient) measurement. That is, by sweeping an input signal over frequency and measuring the S11 of reflected waves from a stationary first mode converter allows for identification of the lowest loss wavelength which corresponds to the lowest S11 value. The frequency response in which the least amount of energy is reflected corresponds with the lowest loss to the electronic device, and can represent the best energy transfer frequency.

For the multiple source diversity scenario, the aforementioned scheme may be used with each source using the more limited range of frequencies required to ensure a near lossless link. For the multiple source phased array scenario, well known channel state information gathering techniques may be used to gather the required information to optimally transmit data or energy to the desired electronic devices.

In some scenarios for the pure wireless charging scenario, a full communication modem may not be required. Instead the devices may utilize a backscatter technology like RFID (Radio-frequency identification) to encode ID information, desired power and received signal strength etc. in the reflected signal. For any communication scheme utilizing the surface waveguide channel at a wavelength where the cavity has been optimized for energy transfer (and therefore maximal reflections and minimal loss), there will be a severe delay spread in the transferred data. The modem used and the bit rates will need to be adjusted accordingly to handle this. Well known techniques from the wireless industry like OFDM (orthogonal frequency-division multiplexing) can be used to handle the delay spread.

To create a communication channel for purposes other than determining the low loss wavelength for energy transfer, a more elegant solution could be to use a lower frequency for communication than what is used for energy transfer. This is because the field extension is greater for lower frequencies so by using a lower frequency than what the waveguide cavity was designed for energy transfer, the reflections at the boundaries will be lower thereby causing more energy to escape and thus reducing the delay spread, thereby creating a better channel for high capacity data transfer with flatter channel response. In the above example a wave velocity of 0.98 times the speed of light (c) would ensure that most of the energy leaks off the waveguide requiring a frequency in the 5 GHz to 6 GHz range. As the loss between the converters would still be close to zero despite there being intentional leakage off the waveguide, the transmitter power for the communication channel can be set within a few tens of dB from the thermal noise floor and still guarantee a high signal to noise ratio adequate for higher spectral efficiencies. Transmitting at 20 dB above the thermal noise floor and achieving a loss of better than 5 dB on the surface waveguide between endpoints, may result in a maximum of 4 bps/Hz while making it physically impossible to capture enough energy to decode a message at any distance of more than 2 inches from the surface waveguide and practically impossible at almost any distance, as at any point along the periphery of the surface waveguide only a small fraction of the total energy would leak.

FIG. 7 shows is a flow chart that includes steps of a method of coupling electro-magnetic energy to an electronic device, according to an embodiment. A first step 710 includes coupling, by a first mode converter electro-magnetic waves of a first mode to a two-dimensional conductive surface of a surface waveguide having a second mode, wherein the electro-magnetic waves of the second mode propagate across the two-dimensional conductive surface of the surface waveguide, wherein the surface waveguide supports propagation of electro-magnetic waves over a two-dimensional conductive surface of the surface waveguide, wherein the two-dimensional conductive surface is treated to increase a surface reactance of the two-dimensional conductive surface over a frequency range of the electro-magnetic waves, and to while maintaining an insertion loss of the surface waveguide below a threshold. A second step 720 includes coupling, by a second mode converter of the electronic device, at least a portion of the electro-magnetic waves of the two-dimensional conductive surface.

As previously described, at least some embodiments further include treating the two-dimensional conductive surface comprises at least one of modulating the two-dimensional conductive surface, or affixing a dielectric layer adjacent to the two-dimensional conductive surface.

As previously described, for at least some embodiments the coupled at least the portion of the electro-magnetic waves of the two-dimensional conductive surface provides at least one of electro-magnetic energy for charging the electronic device, or facilitates communication with the electronic device. As previously described, for at least some embodiments As previously described, for at least some embodiments a conductive wall formed is at a periphery of the two-dimensional conductive surface. At least some embodiments include selecting a height of the conductive wall based on at least one of a frequency of the electro-magnetic waves, a dielectric constant of the dielectric layer, or a thickness of the dielectric layer.

As previously described, for at least some embodiments a coupled at least a first portion of the electro-magnetic waves of the two-dimensional conductive surface having at least a first frequency provide electro-magnetic energy for charging the electronic device, and wherein a coupled at least a second portion of the electro-magnetic waves of the two-dimensional conductive surface having at least a second frequency facilitates communication between the apparatus and the electronic device. For an embodiment, the first frequency is greater than the second frequency, and a height of the conductive wall is selected based on the first frequency and the second frequency, wherein at least predetermined amount of energy of the electromagnetic waves at the first frequency is reflected by the conductive wall, and at least a predetermined amount of energy of the electromagnetic waves at the second frequency is not reflected by the conductive wall.

Although specific embodiments have been described and illustrated, the embodiments are not to be limited to the specific forms or arrangements of parts so described and illustrated. The described embodiments are to only be limited by the claims.

What is claimed:

1. An apparatus comprising:
   a surface waveguide configured to support propagation of a plurality of electro-magnetic waves over a two-dimensional conductive surface of the surface waveguide, wherein the two-dimensional conductive surface is treated to increase a surface reactance of the two-dimensional conductive surface over a frequency range of the plurality of electro-magnetic waves, while maintaining an insertion loss of the surface waveguide below a first threshold;
   a first mode converter configured to couple first electro-magnetic waves of a first mode to the two-dimensional conductive surface, wherein second electro-magnetic waves of a second mode propagate across the two-dimensional conductive surface of the surface waveguide as a result of the coupling of the first electro-magnetic waves;
   wherein a height of a field extent of the second electro-magnetic waves is maintained below a second threshold, wherein the height of the field extent of the plurality of electro-magnetic waves comprises a height at which at least a certain amount of energy is below a height above the two-dimensional conductive surface of the surface waveguide; and
   wherein at least a portion of the second electro-magnetic waves propagating across the two-dimensional conductive surface are coupled to an electronic device through a second mode converter of the electronic device.

2. The apparatus of claim 1, wherein the two-dimensional conductive surface is treated by affixing a dielectric layer adjacent to the two-dimensional conductive surface.

3. The apparatus of claim 1, wherein the two-dimensional conductive surface is treated by modulating the two-dimensional conductive surface.

4. The apparatus of claim 1, wherein the second electro-magnetic waves that propagate across the two-dimensional conductive surface provide electro-magnetic energy to charge the electronic device.

5. The apparatus of claim 1, wherein the second electro-magnetic waves that propagate across the two-dimensional conductive surface facilitates communication between the apparatus and the electronic device.

6. The apparatus of claim 1, wherein the second electro-magnetic waves that propagate across the two-dimensional conductive surface are coupled to a plurality of electronic devices through a plurality of mode converters of the plurality of electronic devices.

7. The apparatus of claim 1, further comprising:
   a conductive wall formed at a periphery of the two-dimensional conductive surface.

8. The apparatus of claim 7, configured to:
   facilitate selection of a height of the conductive wall based on at least one of a frequency of the plurality of electro-magnetic waves, a dielectric constant of a dielectric layer, or a thickness of the dielectric layer.

9. The apparatus of claim 7, wherein a first portion of the second electro-magnetic waves that propagate across the two-dimensional conductive surface at a first frequency provide electro-magnetic energy to charge the electronic device, and wherein a second portion of the electro-magnetic waves that propagate across the two-dimensional conductive surface at a second frequency facilitates communication between the apparatus and the electronic device.

10. The apparatus of claim 9, wherein the first frequency is greater than the second frequency, and a height of the conductive wall is selected based on the first frequency and the second frequency.

11. The apparatus of claim 10, wherein at least a first predetermined amount of energy of the second electro-magnetic waves at the first frequency is reflected by the conductive wall, and at least a second predetermined amount of energy of the second electro-magnetic waves at the second frequency is not reflected by the conductive wall.

12. The apparatus of claim 1, wherein at least one of a frequency of the second electro-magnetic waves propagating over the two-dimensional conductive surface of the surface waveguide, a thickness of a dielectric layer of the surface waveguide, a dielectric constant of the dielectric layer, or a surface modulation of the two-dimensional conductive surface, is selected to maintain the height of the field extent of the second electro-magnetic waves below the second threshold.

13. The apparatus of claim 1, wherein at least one of a frequency of the second electro-magnetic waves propagating over the two-dimensional conductive surface of the surface waveguide, a thickness of a dielectric layer of the surface waveguide, a dielectric constant of the dielectric layer, or a surface modulation of the two-dimensional conductive surface, is selected to ensure that the surface waveguide leaks less than a selected percentage of energy of the second electro-magnetic waves in an instance in which objects are proximate to the surface waveguide.

14. The apparatus of claim 1, wherein the surface reactance of the two-dimensional conductive surface varies across the two-dimensional conductive surface according to a predetermined pattern.

15. A method of coupling electro-magnetic energy to an electronic device comprising:
coupling, by a first mode converter, first electro-magnetic waves of a first mode to a two-dimensional conductive surface of a surface waveguide, wherein second electro-magnetic waves of a second mode propagate across the two-dimensional conductive surface of the surface waveguide as a result of the coupling of the first electro-magnetic waves; wherein
supporting, by the surface waveguide, propagation of the second electro-magnetic waves over a two-dimensional conductive surface of the surface waveguide, wherein the two-dimensional conductive surface is treated to increase a surface reactance of the two-dimensional conductive surface over a frequency range of the second electro-magnetic waves, while maintaining an insertion loss of the surface waveguide below a first threshold;
maintaining a height of a field extent of the second electro-magnetic waves below a second threshold, wherein the height of the field extent of the second electro-magnetic waves comprises a height at which at least a certain amount of energy is below at height above the two-dimensional conductive surface of the surface waveguide; and
coupling, by a second mode converter of the electronic device, at least a portion of the second electro-magnetic waves of the two-dimensional conductive surface.

16. The method of claim 15, further comprising:
treating the two-dimensional conductive surface comprises at least one of modulating the two-dimensional conductive surface, or affixing a dielectric layer adjacent to the two-dimensional conductive surface.

17. The method of claim 15, wherein a conductive wall is formed at a periphery of the two-dimensional conductive surface, and the method further comprises:
selecting a height of the conductive wall based on at least one of a frequency of the second electro-magnetic waves, a dielectric constant of a dielectric layer, or a thickness of the dielectric layer.

18. The method of claim 15, wherein the second electro-magnetic waves of the two-dimensional conductive surface provides electro-magnetic energy to at least one of charge the electronic device, or facilitate communication with the electronic device.

19. The method of claim 18, wherein at least a first portion of the second electro-magnetic waves that propagate across the two-dimensional conductive surface having a first frequency provides other electro-magnetic energy to charge the electronic device, and wherein a second portion of the second electro-magnetic waves that propagate across the two-dimensional conductive surface having a second frequency facilitates communication between an apparatus and the electronic device.

20. The method of claim 19, wherein the first frequency is greater than the second frequency, and a height of a conductive wall is selected based on the first frequency and the second frequency, wherein at least a first predetermined amount of energy of the second electro-magnetic waves at the first frequency is reflected by the conductive wall, and at least a second predetermined amount of energy of the second electro-magnetic waves at the second frequency is not reflected by the conductive wall.

* * * * *